Aug. 22, 1961 T. P. SYLVAN 2,997,665

MULTIVIBRATOR CIRCUIT HAVING A BISTABLE CIRCUIT DRIVING
AND TRIGGERED BY A RELAXATION CIRCUIT

Filed July 22, 1959

INVENTOR:
TAGE P. SYLVAN,
BY Julius J. Zaskalicky
HIS ATTORNEY.

United States Patent Office 2,997,665
Patented Aug. 22, 1961

2,997,665

MULTIVIBRATOR CIRCUIT HAVING A BISTABLE CIRCUIT DRIVING AND TRIGGERED BY A RELAXATION CIRCUIT

Tage P. Sylvan, Liverpool, N.Y., assignor to General Electric Company, a corporation of New York Filed July 22, 1959, Ser. No. 828,857
4 Claims. (Cl. 331—113)

This invention relates in general to wave generation circuits and more particularly relates to improvement in multivibrator circuits incorporating transistor-type devices.

Conventional transistor multivibrator circuits have some serious disadvantages which limit their usefulness. In such conventional multivibrator circuits coupling capacitors usually serve as timing capacitors. If long time periods are required, electrolytic-type capacitors having large capacitances must be used with the result that the accuracy and stability of the timing periods of the output are severely limited. In such circuits the coupling capacitors also inherently produce considerable distortion in the output wave. This is particularly true if there is an appreciable difference in the duration of the two parts of the timing periods of the resultant wave.

The present invention is directed to overcoming limitations such as described above in conventional multivibrator circuits. It is an object of the present invention to provide a circuit which develops an ideal rectangular waveform output.

It is another object of the present invention to provide a circuit which permits the independent adjustment of the two parts of a time cycle of an output wave over a very wide range.

It is still another object of the present invention to provide wave generating circuits which are reliable and stable in operation yet which are formed of a minimum number of elements.

It is a further object of the present invention to provide a wave generation circuit which can produce rectangular waves of very long periods with but a single timing capacitor of minimum size.

It is a still further object of the present invention to provide a wave generation circuit the periods of which are relatively independent of temperature and supply voltage variations, and which is relatively insensitive to load variations with respect to the effect they have on timing periods.

Figure 1:
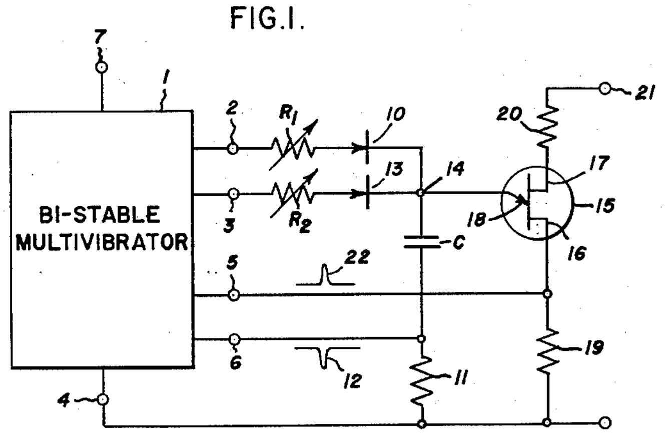
Figure 2:
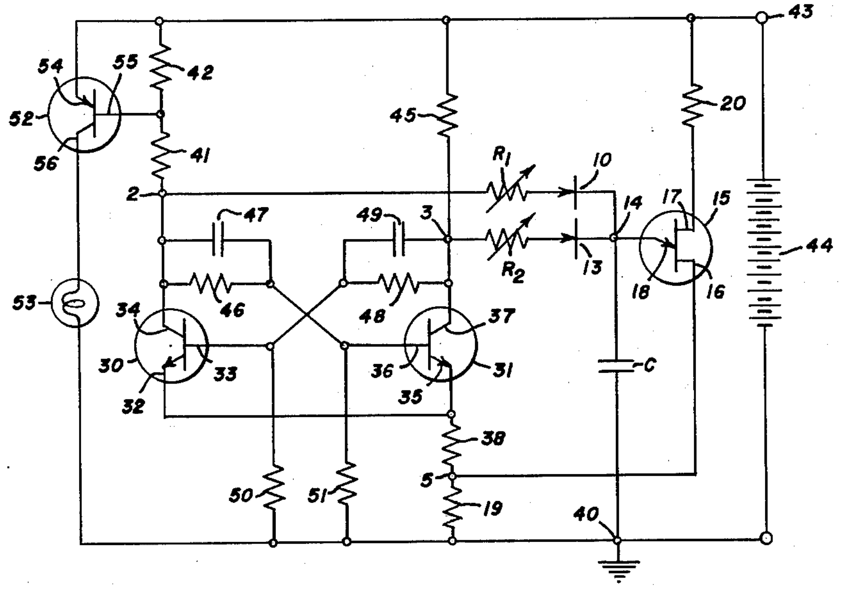

The features of my invention which I believe to be novel are set forth with particularity in the appended claims. My invention itself, however, both as to its organization and method of operation, together with further objects and advantages thereof, may best be understood by reference to the following description taken in accordance with the accompanying drawing in which:

FIGURE 1 is a diagram partially in block form and partially in schematic form showing an embodiment of the present invention; and FIGURE 2 is a schematic diagram of an embodiment of the invention showing the utilization of the wave generation circuit according to the present invention in developing periodic pulses of energy across a lamp load.

The principle of the present invention will be understood by referring to FIGURE 1. The block 1 represents a conventional multivibrator circuit having points 2 and 3 at which voltages are developed with respect to a common point 4. The multivibrator has two stable states. In one state the voltage at one of the points 2 and 3 is positive with respect to the other and in the other state the voltage at the other point is positive with respect to the one point. The multivibrator further has points 5 and 6 at which suitable pulses may be applied to cause the device to be triggered from one conductive state to the other. Of course, it is well known that in conventional multivibrators a single point may also be used and that the successful application of signals to such a point, usually in the form of pulses, causes the device to switch from one state to the other. Point 7 on the multivibrator block 1 represents a point of application of operating potential. Common point 4 is the other terminal which is used for this purpose. The multivibrator circuit described can be any conventional multivibrator circuit utilizing transistors, controlled rectifiers, vacuum tubes and any other suitable amplifying elements.

In accordance with the present invention, a resistance R1, a unilaterally conducting device 10 and a capacitor C are connected in series between terminal 2 and the common point 4. A resistance 11 is also connected between the capacitor C and the common point 4 for purposes of providing a triggering signal 12 at the appropriate time to the multivibrator. Another resistance R2 and another unilaterally conducting device 13 are connected in series between terminal 2 and point 14 which is common to capacitor C and unilaterally conducting device 10. Each of the unilaterally conducting devices 10 and 13 are poled to be conductive when the terminals of the multivibrator 2 and 3 to which they are connected are positive with respect to junction point 14. The unijunction transistor 15 provides a means for periodically discharging the capacitor C. Other devices such as thyratrons, of course, could be used for this purpose.

The unilateral unijunction transistor 15 comprises a bar of semiconductor material of one conductivity type which may be either P or N type, in this circuit it is of N-type, to which are made ohmic contacts 16 and 17 referred to as base one and base two, respectively. Intermediate the ends of the bar a rectifying contact referred to as emitter 18 is provided. The rectifying contact advantageously may be formed by fusing impurities of one conductivity type into a bar of opposite conductivity type to produce a region of opposite type conductivity therein which forms a rectifying junction with the bar. When an operating potential is applied across the base electrodes of the unijunction transistor with the base one negative with respect to base two, and a potential of increasing positive magnitude is applied between the emitter and base one, the emitter is initially non-conductive with respect to base one. As the potential on the emitter is increased, a point called the peak point voltage $V_p$ is reached at which the emitter becomes positive with respect to the potential existing in the bar adjacent to the emitter. At this point current starts to flow from the emitter to base one. The flow of current in that portion of the bar between emitter 18 and base one causes a lowering of the resistance therein, thereby permitting a further increase in current which in turn causes a still further decrease in resistivity. Accordingly, it is seen that the applied voltage between the emitter 18 and base one to sustain a particular current becomes increasingly less until a point is reached at which a further increase in current does not cause a further reduction in resistance. Beyond this point an increase in voltage causes current to increase. Thus it is seen that the unijunction transistor is a device which has a negative resistance characteristic. Such a device is described in U.S. Patent 2,769,826—Lesk, assigned to the assignee of the present invention. The ratio of the voltage between the emitter and base one at which the device fires and the voltage applied between the two bases is referred to as the stand-off ratio and is denoted $\eta$.

Base electrode 16 is connected through base resistance 19 to conductor 4. Base 16 is also connected to point 5 of the multivibrator 1 and in the circuit shown provides a signal 22 thereto. Base electrode 17 is connected through a load resistance 20 to terminal 21. Emitter 18 is connected to point 14.

Referring now to the operation of the circuit of FIGURE 1, after application of supply potentials to the circuit of this figure, assume initially that terminal 2 is positive with respect to terminal 3. Assume further that it has just been switched to this condition and that capacitor C is in its discharge state having just been discharged by unijunction transistor 15 and that it is now in a condition to be charged. Capacitor C will thus be charged through series resistance R1 and unilaterally conducting device 10. (During this time, as point 14 is positive with respect to point 3, the unilaterally conducting device 13 isolates point 3 from the charging circuit.) As the voltage across the capacitor C increases, the firing point of emitter 18 is eventually reached at which point unijunction transistor 15 fires, causing a discharge of capacitor C through the emitter 18-base 16 circuit of the unijunction transistor. At the instant of discharge of capacitor C, a pulse of current flows through resistance 19, developing the voltage 22 thereacross and simultaneously developing the voltage 12 across resistance 11. These pulses cause the multivibrator 1 to switch from its one to it other stable state, that is, the state at which the voltage at point 3 is positive with respect to the voltage at point 2. During this time as the unijunction transistor is unable to draw current from the circuit sufficient to maintain conduction between electrodes 18 and 16, it is extinguished, and hence the capacitor C now is permitted to charge through resistance R2 and unilaterally conducting device 13. It should be noted that now point 14 is positive with respect to point 2 and accordingly unilaterally conducting device 10 is back biased and isolates terminal 2 from the charging circuit. As capacitor C charges through resistance R2 and unilaterally conducting device 13, the potential of point 14 rises. When the potential of point 14 reaches a value sufficient to fire the unijunction transistor 15, the device fires and develops a pair of pulses across resistances 11 and 19 as previously mentioned, and causes the device again to switch to the other stable condition, namely, that condition in which the voltage across terminal 2 is positive with respect to terminal 3, thus completing the cycle of operation of the device. It will be appreciated that any circuit which functions to discharge capacitor C at a predetermined voltage and permit its recharge thereafter in accordance with the principles of the invention would be saisfactory.

Thus, a circuit has been provided in which capacitor C serves as the timing capacitor for both parts of the period of a rectangular wave output. The capacitor C charges alternately through resistances R1 and R2. The timing periods of the two portions of the timing cycle are determined by the equations $$\text{Timing period}_1 = R_1C\ 1n\frac{1}{(1-\eta)}$$

$$\text{Timing period}_2 = R_2C\ 1n\frac{1}{(1-\eta)}$$

where $\eta$ is the intrinsic stand-off ratio of the transistor as defined above. The periods of the wave developed by the multivibrator 1 are independently controllable by the time constants corresponding to the respective charge circuits. The periods may be made variable by making resistances R1 and R2 variable. Of course, it will be appreciated that the unilaterally conducting devices 10 and 13 may be eliminated and the circuit would operate in a manner similar to the manner explained above. However, with such an arrangement the timing circuit for each of the timing periods would not be independent of one another.

Referring now to FIGURE 2, there is shown a schematic diagram of a flasher circuit incorporating the principles of the present invention. The multivibrator circuit proper comprises a pair of NPN transistors 30 and 31. NPN transistor 30 comprises an emitter 32, a base 33 and a collector 34. NPN transistor 31 comprises an emitter 35, a base 36 and a collector 37. Emitters 32 and 35 are connected through common cathode resistances 38 and 19 to ground point 40. Collector 34 is connected through load resistances 41 and 42 to the positive terminal 43 of a source of operating potential 44, the negative terminal of which is connected to ground point 40. The collector 37 is connected through load resistance 45 to terminal 43. Regenerative feedback is provided from collector 34 to base 36 through a parallel combination of resistance 46 and capacitance 47 connected between these elements. Similarly, regenerative feedback is provided from collector 37 to base 33 through a parallel combination of resistance 48 and capacitance 49 connected between these elements. Base 33 is connected to ground through resistance 50 and base 36 is connected to ground through resistor 51. The unijunction transistor circuit of FIGURE 2 is very similar to the circuit of FIGURE 1 and to the extent that the circuit of FIGURE 2 incorporates elements common to FIGURE 1, identical numerals are used to indicate these common elements.

The operation of the circuit described is as follows: Assume that initially device 31 is conductive and device 30 is non-conductive. Point 2 is thus positive with respect to point 3, thus permitting capacitor C to charge to a point sufficient to fire unijunction transistor 15. When unijunction transistor 15 is fired, a positive pulse is developed across resistance 19. The positive pulse would tend to cut device 31 off, thereby tending to raise point 3 in potential. A rise in potential of point 3 would tend to initiate conduction in transistor 30 which would tend to cause the potential at point 2 to drop. This change is coupled through the regenerative network of resistance 46 and capacitor 47 to base 36 and would tend to drop the potential of the base 36 of transistor 32, tending to further cut it off. As a result of this regenerative action, in a very short time device 30 becomes conductive and device 31 becomes non-conductive, thereby causing the potential at point 3 to become positive with respect to potential at point 2 and permitting the circuit to execute the second period of its cycle as explained in connection with FIGURE 1.

The output developed across load resistance 41 and 42 may be utilized to trigger a transistor 52 for activation of a load, shown as a lamp 53, connected in series with the electron discharge path of the transistor 52 across the load terminals 43, 40. In the circuits shown, the transistor 52 comprises an emitter 54, a base 55, and a collector 56. The emitter 54 is connected to terminal 43, the base 55 is connected to the junction of resistance 41 and 42 and the collector 56 is connected to another terminal of lamp 53, the other terminal of which is connected to point 40.

While I have shown a particular embodiment of my invention, it will be understood, of course, that I do not wish to be limited thereto, since many modifications may be made, and I therefore contemplate by the appended claims to cover any such modifications as fall within the true spirit and scope of my invention.

What I claim as new and desire to secure by Letters Patent of the United States is:

1. In combination, an electric wave generator having a pair of terminals at each of which the voltage with respect to a point of reference potential is changeable from one magnitude to another in response to an applied signal, said generator having the characteristic that when the potential at one of said terminals is of one magnitude, the potential at the other of said terminals is of the other magnitude, a first resistance and a capacitance connected in series between one of said terminals and said reference point, a second resistance and said capacitance connected between the other of said terminals and said reference point, said resistances being of magnitudes permitting the charge on said capacitance to be gradually alterable, means for suddenly altering the charge on said capacitance when the voltage thereacross reaches a particular value and thereafter permitting said resistances to determine the charging of said capacitance, means responsive to said sudden alteration of charge on said capacitance to alter the voltages at said terminals.

2. In combination, an electric wave generator having a pair of terminals at each of which the voltage with respect to a point of reference potential is changeable from one magnitude and polarity to another magnitude and said polarity in response to an applied signal, said generator having the characteristic that when the potential at one of said terminals is of one magnitude, the potential at the other of said terminals is of the other magnitude, a first charging resistance and a capacitance connected in series between one of said terminals and said reference point, a second charging resistance and said capacitance connected between the other of said terminals and said reference point, said resistances being of magnitudes permitting said capacitance to be gradually charged, means for suddenly discharging said capacitance when the voltage thereacross reaches a particular value, and thereafter permitting said resistances to determine the charging of said capacitance, means responsive to the sudden discharge of said capacitance to alter the voltages at said terminals.

3. In combination, an electric wave generator having a pair of terminals at each of which the voltage with respect to a point of reference potential is changeable from one magnitude and polarity to another magnitude and said polarity in response to an applied signal, said generator having the characteristic that when the potential at one of said terminals is of one magnitude, the potential at the other of said terminals is of the other magnitude, a first charging resistance, a unilaterally conducting device and a capacitance connected in series between one of said terminals and said reference point, a second charging resistance, another unilaterally conducting device and said capacitance connected between the other of said terminals and said reference point, said resistances being of magnitudes permitting said capacitance to be gradually charged, said unilaterally conducting devices being poled to permit charging of said capacitance from said terminals, means for suddenly discharging said capacitance when the voltage thereacross reaches a particular value, and thereafter permitting said resistances to determine the charging of said capacitance, means responsive to the sudden discharge of said capacitance to alter the voltages at said terminals.

4. In combination, an electric wave generator having a pair of terminals at each of which the voltage with respect to a point of reference potential is changeable from one magnitude and polarity to another magnitude and said polarity in response to an applied signal, said generator having the characteristic that when the potential at one of said terminals is of one magnitude, the potential at the other of said terminals is of the other magnitude, a first charging resistance and a capacitance connected in series between one of said terminals and said reference point, a second charging resistance and said capacitance connected between the other of said terminals and said reference point, said resistances being of magnitudes permitting said capacitance to be gradually charged, a unijunction transistor having an emitter-base one circuit connected in shunt across said capacitance and a base one-base two circuit connected in circuit with a source of operating potential, means responsive to the pulses developed in one of said unijunction-transistor circuits for altering the voltages on said terminals.

References Cited in the file of this patent

UNITED STATES PATENTS

| | | |
|---|---|---|
| 2,154,492 | Clough | Apr. 18, 1939 |
| 2,826,696 | Suran | Mar. 11, 1958 |
| 2,841,712 | Hoge et al. | July 1, 1958 |

OTHER REFERENCES

General Electric Transistor Manual, third edition, copyrighted July 23, 1958, published by G. E. Electronics Park, Syracuse 1, N.Y., page 62.